(No Model.)

D. N. COOK.
CAR BRAKE.

No. 508,409. Patented Nov. 14, 1893.

Witnesses.
Lauritz N. Möller
Alice A. Perkins

Inventor.
David N. Cook
by Urban Andrew
his atty.

UNITED STATES PATENT OFFICE.

DAVID N. COOK, OF SALEM, MASSACHUSETTS.

CAR-BRAKE.

SPECIFICATION forming part of Letters Patent No. 508,409, dated November 14, 1893.

Application filed December 5, 1892. Renewed August 11, 1893. Serial No. 482,925. (No model.)

*To all whom it may concern:*

Be it known that I, DAVID N. COOK, a citizen of the United States, and a resident of Salem, in the county of Essex and State of Massachusetts, have invented new and useful Improvements in Car-Wheel Brake Devices, of which the following, taken in connection with the accompanying drawings, is a specification.

This invention relates to improvements in car wheel brakes adapted for use on electric or horse cars, or cars propelled by other motive power, and it is carried out as follows reference being had to the accompanying drawings, wherein—

Figure 1:
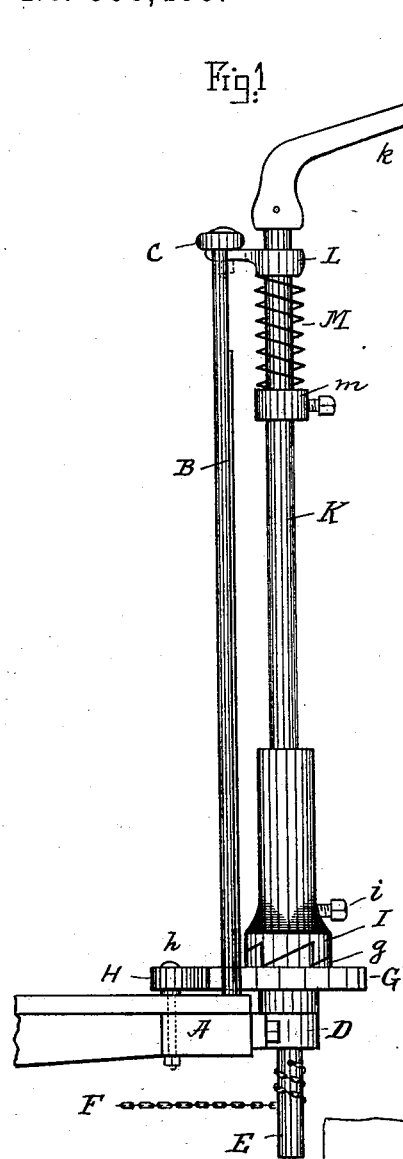
Figure 2:
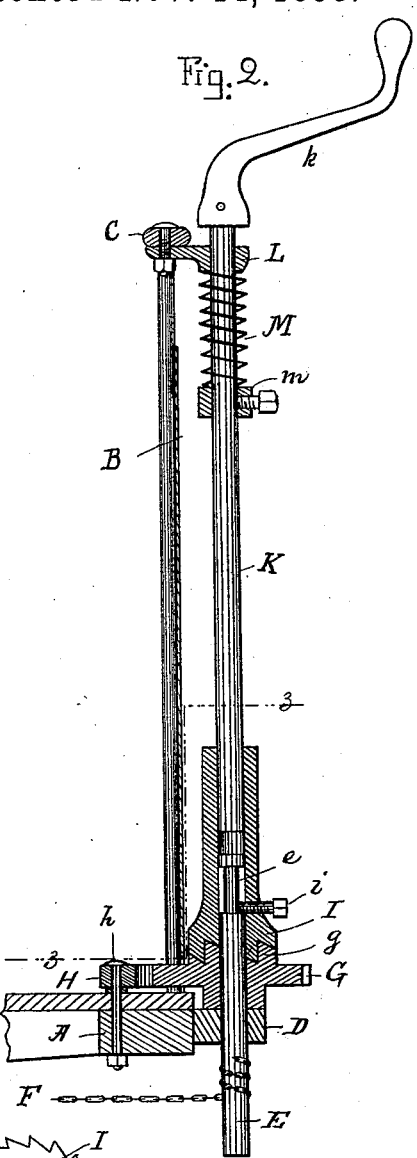
Figure 3:
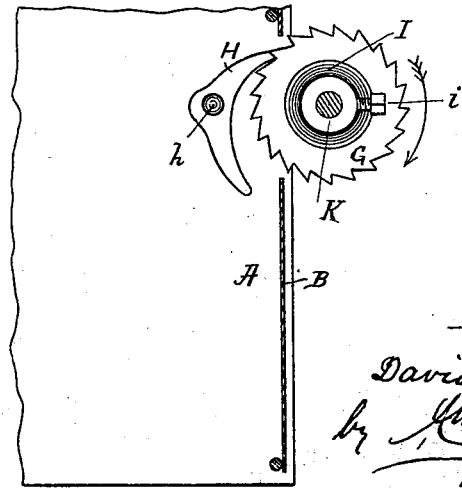

Figure 1 represents a side elevation of the invention; and Fig. 2 represents a longitudinal section of the same. Fig. 3 represents a plan view partly shown in section.

Similar letters refer to similar parts wherever they occur on the different parts of the drawings.

A represents a car platform with its dasher B and rail C as usual.

D is a bearing secured to the car frame in which is journaled the brake shaft E to which is attached the chain F the other end of which is secured in a suitable manner to the brake shoes or their connections as is common in car wheel brake devices.

To the axle E is secured the ratchet wheel G adapted to engage with the pawl H that is pivoted at $h$ to the car platform as usual. On the upper side of the ratchet wheel G is made a toothed clutch $g$ adapted to engage in the teeth of a similar clutch I secured to the crank shaft K which is journaled in a bearing L attached to the rail C or other suitable portion of the car body, and provided at its upper end with a crank or wheel $k$ by means of which the brake is manipulated.

The clutch I is loosely journaled on the upper end of the brake shaft E and is vertically yielding thereon when the said clutch is turned in a direction opposite to that shown by the arrow in Fig. 3.

The clutch I is normally held in engagement with the clutch $g$, preferably by means of a spring M interposed between a collar or projection $m$ on the crank axle K and the bearing L or other stationary part of the car. I have shown for this purpose a coiled spring M in the drawings, but any other form of spring may be used to equal advantage without departing from the essence of my invention; or if so desired the spring may be dispensed with and the clutch I held in engagement with the clutch $g$ by gravity alone.

In practice I prefer to limit the vertical adjustment of the clutch I sufficiently to enable it to be disengaged from the lower clutch $g$, and for this purpose I prefer to make an annular groove $e$, on the upper end of the shaft E, into which groove is made to project a screw or pin $i$ as shown in the drawings.

By turning the crank $k$ in the direction shown by arrow in Fig. 3, a positive motion is imparted to the brake shaft E by the engagement of the clutches I, $g$. By locking the ratchet wheel G in position by means of the pawl H, the crank $k$ and clutch I may be turned in a direction opposite to that shown by arrow in Fig. 3, independent of the lower shaft E, as hereinabove set forth, thus enabling the driver to brake the car without the need of completely rotating the crank and its shaft. This is very advantageous particularly at the end of the braking operation as it permits the driver to hold the crank in the most convenient position for the purpose of exerting his strength in the best direction and thus obtaining better results as compared with brake devices in which the crank is firmly attached to the shaft on which the chain is wound.

Having thus fully described the nature, construction, and operation of my invention, I wish to secure by Letters Patent and claim—

The herein described car wheel brake device consisting in combination with the chain carrying shaft and its ratchet and pawl, of an independent and longitudinally yielding crank axle, a clutch secured to the latter and adapted to engage with a clutch on the chain carrying shaft, substantially as and for the purpose set forth.

In testimony whereof I have signed my name to this specification, in the presence of two subscribing witnesses, this 25th day of November, A. D. 1892.

DAVID N. COOK.

Witnesses:
ALBAN ANDRÉN,
ALICE A. PERKINS.